United States Patent
Hsu

(10) Patent No.: US 6,657,557 B1
(45) Date of Patent: Dec. 2, 2003

(54) INFORMATION COMMUNICATING APPARATUS FOR VEHICLES

(76) Inventor: Te Hsin Hsu, P.O. Box 4-67, Hsin Chuang, Taipei (TW), 242

(*) Notice: Subject to any disclaimer, the term of this patent is extended or adjusted under 35 U.S.C. 154(b) by 0 days.

(21) Appl. No.: 10/143,110

(22) Filed: May 8, 2002

(51) Int. Cl.⁷ ............................................. G08G 1/23
(52) U.S. Cl. .................. 340/988; 340/989; 340/426.19; 340/426.2; 340/825.36; 455/569; 455/575; 455/550; 455/558; 455/457
(58) Field of Search ................ 340/988, 989, 340/426.1, 426.12, 426.13, 426.15, 426.18, 426.19, 426.2, 426.21, 426.22, 825.36, 825.37, 825.38; 455/569, 95, 99, 575, 550, 558, 460, 422, 427, 456, 457

(56) References Cited

U.S. PATENT DOCUMENTS 6,198,919 B1 * 3/2001 Buytaert et al. ............ 455/426
6,405,033 B1 * 6/2002 Kennedy, III et al. ...... 455/556

* cited by examiner

*Primary Examiner*—Jeffery Hofsass
*Assistant Examiner*—Daniel Previl

(57) ABSTRACT

A information communicating device includes a GSM device coupled to a communication interface unit, an input/output interface unit and an anti-theft device coupled to the GSM device, an LP coupled to the GSM device and the communication interface unit for communicating with selected customer service centers, a NAVI and a satellite positioning unit coupled to the LP and the GSM device, for sending information to the LP and the GSM device. The vehicle drivers may receive useful information from the customer service center and to act precisely according to the received information.

9 Claims, 12 Drawing Sheets

INFORMATION COMMUNICATING APPARATUS FOR VEHICLES

BACKGROUND OF THE INVENTION

1. Field of the Invention

The present invention relates to a information communicating apparatus, and more particularly to a information processing and communicating apparatus for vehicles.

2. Description of the Prior Art

Vehicles have been widely used today. People may spend a large amount of time in driving vehicles, and may not work or may not do anything except talking or speaking with the portable or mobile phones. In addition, speaking the phone while driving is a very dangerous problem, such that people have been barred to speak the phones while driving, in many countries. Normally, the typical vehicles may provide an information communicating apparatus for allowing the vehicle drivers to speak the phone without picking up the handsets, and to quickly dial the phones without depressing the buttons. However, the functions of the information communicating apparatus are still limited. For example, the vehicle drivers may not obtain any information from the satellite, with the typical information communicating apparatus.

The present invention has arisen to mitigate and/or obviate the afore-described disadvantages of the conventional information communicating apparatuses.

SUMMARY OF THE INVENTION

The primary objective of the present invention is to provide a information communicating apparatus for allowing the vehicle drivers to communicate with the customer service center, and for allowing the vehicle drivers to receive any useful information from the customer service center and to act precisely according to the received information.

In accordance with one aspect of the invention, there is provided an information communicating apparatus comprising a communication interface unit including a data can bus and a command can bus, a global system for mobile communication (GSM) device coupled to the data can bus and the command can bus of the communication interface unit respectively, an input/output interface unit coupled to the GSM device, an anti-theft device coupled to the GSM device, a location processor (LP) coupled to the GSM device and the data can bus and the command can bus of the communication interface unit, for communicating with selected customer service centers, and for obtaining information from the selected customer service centers, a satellite navigation unit (NAVI) coupled to the data can bus and the location processor (LP) and the GSM device, for sending information to the LP and the GSM device, a satellite positioning unit coupled to the LP and the GSM device, for sending information to the LP and the GSM device, a card reader/writer coupled to the data can bus and the command can bus of the communication interface unit, for receiving and sending out the information to and from the communication interface unit, a warning device coupled to the command can bus of the communication interface unit, for sending out warning information, a remote control or pager receiver device coupled between the communication interface unit and the GSM device for controlling the GSM device, and a computerized monitoring device coupled to the data can bus and the command can bus of the communication interface unit, for monitoring and checking the information sending into and out of the communication interface unit.

The GSM device includes a GSM module, a data/voice module, a recording module, and a data or information receiving module provided therein.

The input/output interface unit includes at least one antenna, a microphone, a radio, a displayer, a intelligent transportation system switch, an ear piece, an air bag actuating device, at least one hand set, and a mobile phone interface coupled to the GSM device, and a personal virtual assistant device coupled to the GSM device.

The antenna may be a general purposes radar (GPS) antenna, or a GSM antenna, or a radio frequency antenna.

The satellite navigation unit (NAVI) includes a processor device coupled to the data can bus for receiving the information sending out from the selected customer service centers.

A code transforming device may further be provided and coupled between the processor device of the satellite navigation unit and the data can bus for receiving the information sending out from the selected customer service centers.

The processor device of the satellite navigation unit is coupled to the LP and the GSM device, for sending the information to the LP and the GSM device.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
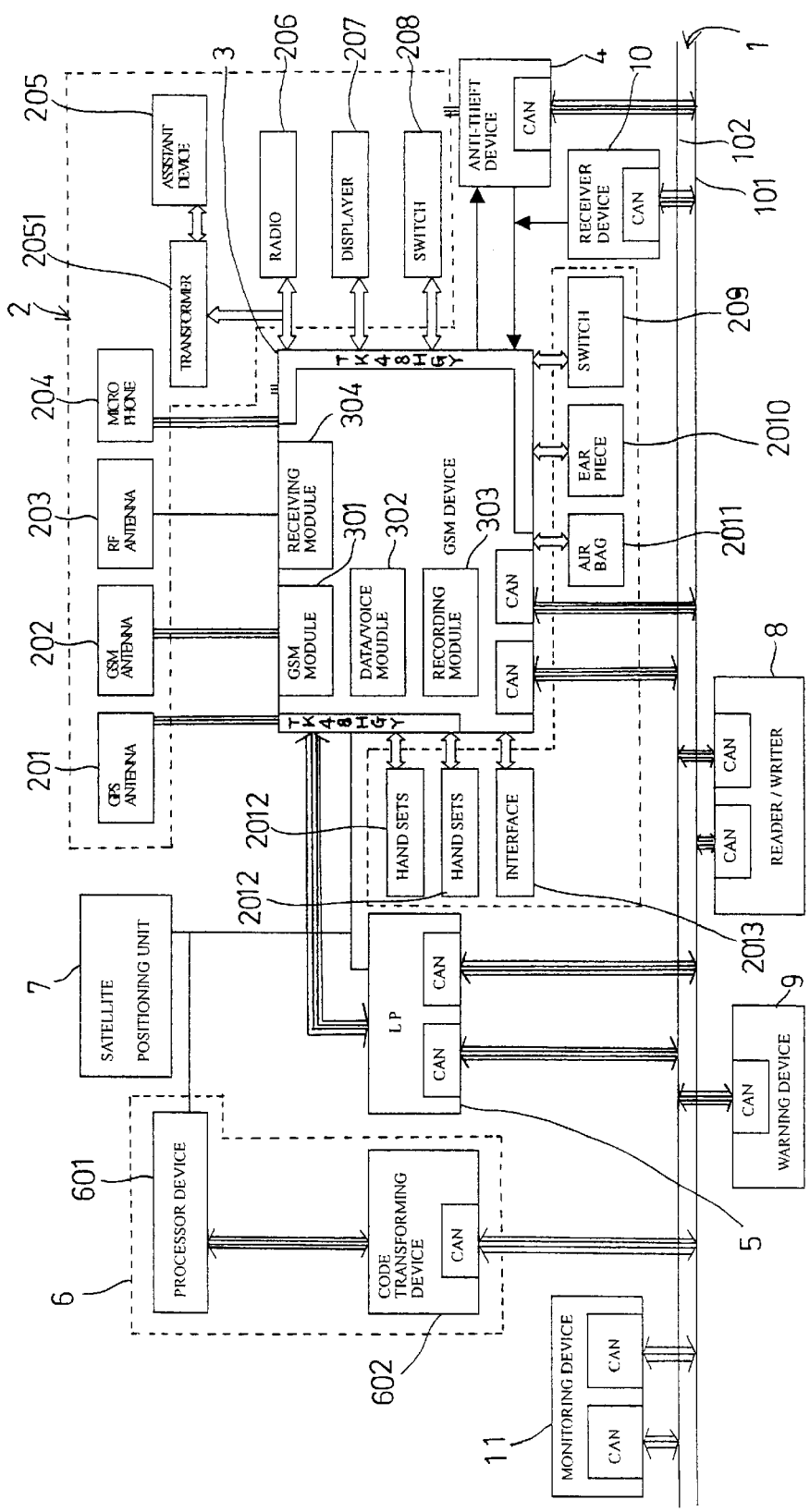
FIG. 1 is a block diagram showing an information communicating apparatus in accordance with the present invention.

Referring to the drawings, and initially to FIG. 1, an information communicating apparatus in accordance with the present invention comprises a communication interface unit 1 including a data can bus 101, and a command can bus 102 for coupling to various members or devices which will be discussed hereinafter. A global system for mobile communication (GSM) device 3 includes two cans coupled to the data can bus 101 and the command can bus 102 respectively, and includes a GSM module 301, a data/voice module 302, a recording module 303, and a data or information receiving module 304 provided therein.

An input/output interface unit 2 includes a general purposes radar (GPS) antenna 201, a GSM antenna 202, a radio frequency antenna 203, a microphone 204, a radio 206, a displayer 207, a intelligent transportation system switch 208, a switch 209 for attaching to the steering wheel of the vehicle, an ear piece 2010, an air bag actuating device 2011, one or more hand sets 2012, and a mobile or portable phones interface 2013 coupled to the GSM device 3, and a personal virtual assistant device 205 directly coupled to the GSM device 3, or indirectly coupled to the GSM device 3 via a transformer 2051.

In operation, the elements of the input/output interface unit 2 may be used for communicating with the selected customer service centers via telecommunicating or wireless communicating processes, and/or for recording information, receiving and sending information, receiving radio programs, collecting and speaking phones, receiving and displaying information, controlling the air bags, quickly dialing the phones, monitoring purposes, tracing the vehicles, etc.

An anti-theft device 4 may be provided and coupled to the GSM device 3, and coupled to the command can bus 102 and/or the data can bus 101 of the communication interface unit 1 for receiving the data or information which is supplied to the data can bus 101, for example, when the anti-theft device 4 of the vehicle has been actuated by any unauthorized persons. A location processor (LP) 5 couples the GSM device 3 to the data can bus 101 and the command can bus 102 of the communication interface unit 1, for communicating with the selected customer service centers, and for obtaining the position data of the vehicles from the selected customer service centers.

A satellite navigation unit (NAVI) 6 includes a main bus or a processor device 601 directly coupled to the data can bus 101, or indirectly coupled to the data can bus 101 via a code transforming device 602, for receiving the information or the location of the vehicles sending out from the selected customer service centers. The processor device 601 of the satellite navigation-unit 6 is also coupled to the location processor (LP) 5 and the GSM device 3, for sending the information or the location or the coordinate of the vehicles to the location processor (LP) 5 and/or the GSM device 3.

A satellite positioning unit 7 is provided and coupled to the location processor (LP) 5 and/or the GSM device 3, for sending the information or the location or the coordinate of the vehicles to the location processor (LP) 5 and/or the GSM device 3. A card reader/writer 8 is coupled to the data can bus 101 and the command can bus 102 of the communication interface unit 1, for receiving and sending out the information or the data or the sounds to and from the communication interface unit 1.

A warning device 9 is coupled to the command can bus 102 of the communication interface unit 1, for sending out the information or the warning signals or sounds to warn the vehicle drivers or the users. A remote control or pager receiver device 10 is coupled between the data can bus 101 of the communication interface unit 1 and the GSM device 3 and/or the anti-theft device 4, for controlling the GSM device 3 and/or the anti-theft device 4, or for setting the GSM device 3 into a sleeping module.

A computerized monitoring device 11 may further be provided and coupled to the data can bus 101 and the command can bus 102 of the communication interface unit 1, for monitoring and/or checking whether the information or the data or the sounds sending into or out of the communication interface unit 1 are correct or not, and for monitoring and controlling the working conditions of the other devices, including the elements of the input/output interface unit 2, the GSM device 3, the anti-theft device 4, the location processor (LP) 5, the satellite navigation unit 6, the satellite positioning unit 7, the card reader/writer 8, the warning device 9, the pager receiver 10, etc.

Figure 2:
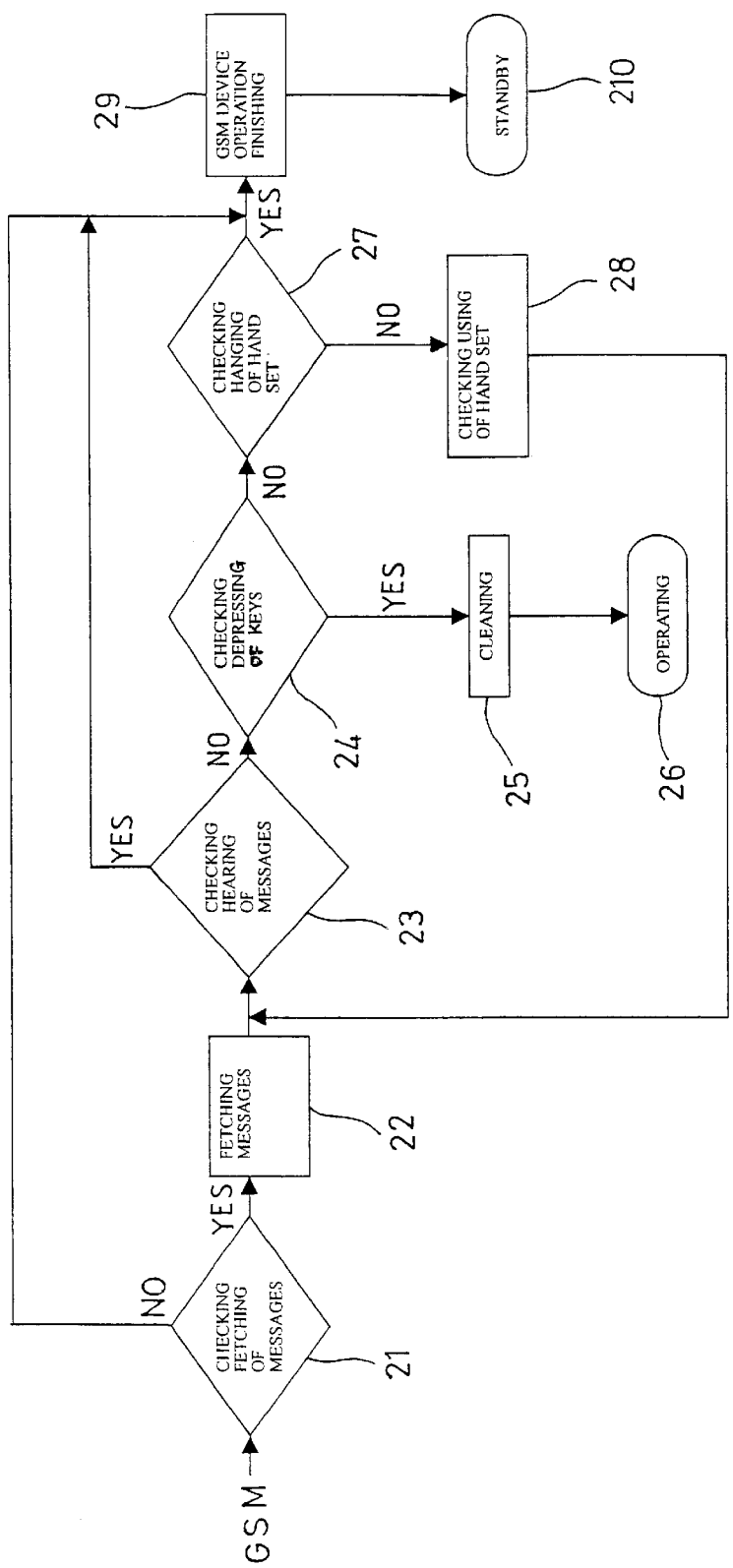
FIGS. 2, 3, 4, 5, 6, 7, 8, 9, 10, 11, 12 are block diagrams illustrating the operation of the information communicating apparatus.

Referring next to FIG. 2, illustrated is the operating procedures when the GSM device 3 is actuated or initialized or operated. First, a process 21 will be conducted to check whether any messages left in the customer service centers have not been fetched or heard or not. If yes, the vehicle drivers or the users may fetch or listen the messages left in the customer service centers in process 22, and the displayer 207 may show and flash the word "MESSAGE" for about 10 seconds, for example. The following process 23 may be used for checking whether the messages have been completely heard by the users or not.

If the messages have not been completely heard by the users yet, a process 24 may be conducted to check whether the keys of the handset have been depressed or not. If one or more of the keys of the handset have been depressed or actuated, the information in the displayer 207 may be cleaned at process 25, and the handset may be operated in the process 26. A process 27 may then be used to check whether the handset has been hung up or not. If the handset has not been hung up yet, a process 28 may be used to check whether the handset has been wrongly used or not and may go back to the process 23 for checking whether the messages have been completely heard by the users or not.

If the handset has been checked to be hung up in process 27, the information communicating apparatus may then move to the GSM device operation finished process 29, and may then move to a standby process 210, and may then wait for further use. If the messages have been checked to be completely heard by the users in the process 23, the information communicating apparatus may be directly moved to the process 29 where the operation of the GSM device 3 is designated or selected to be finished or completed.

Figure 3:
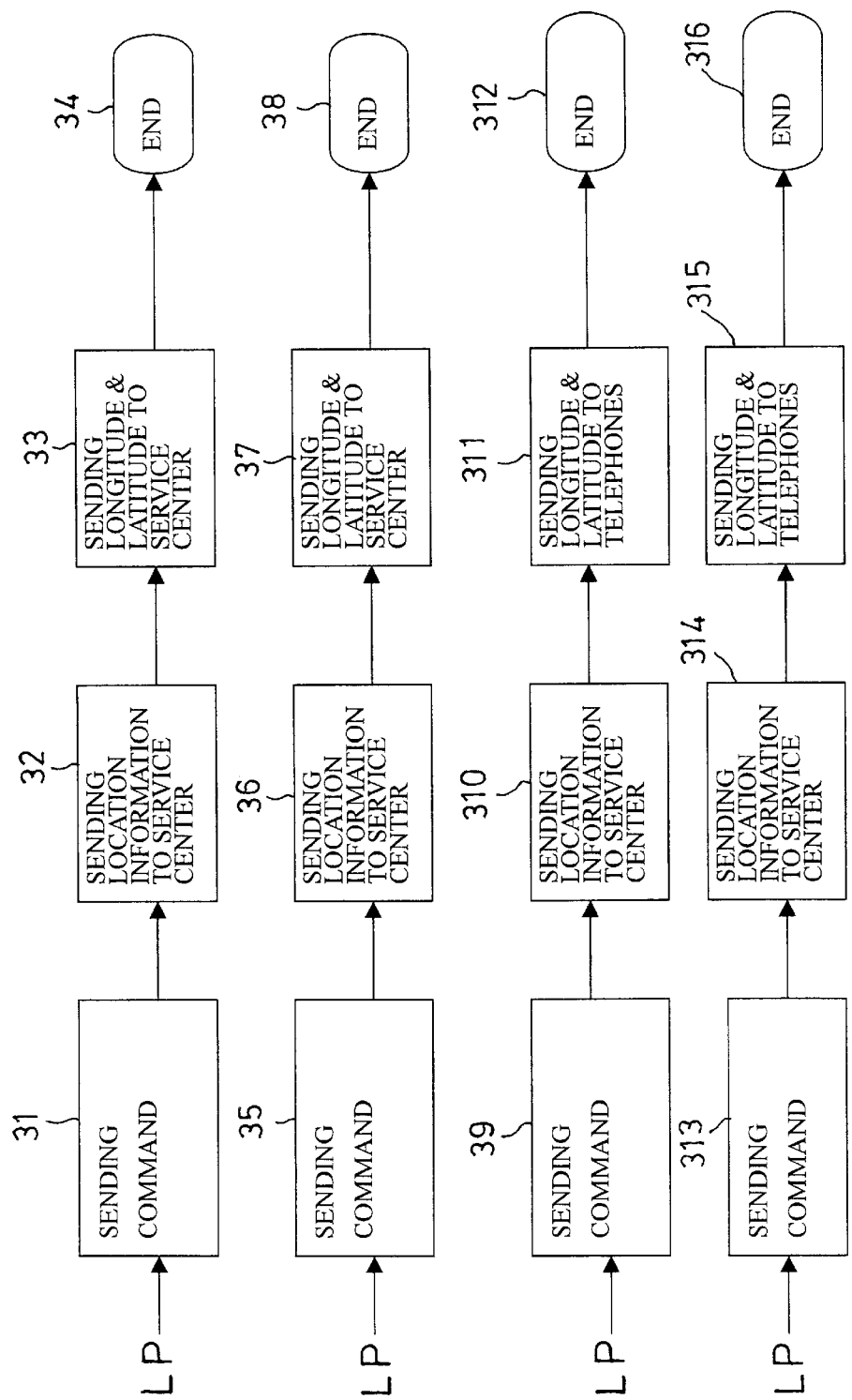

Referring next to FIG. 3, illustrated is the operation of the location processor (LP) 5. For example, the LP 5 may send out a command to the command can bus 102 in the process 31, and the GSM device 3 may then send out the location information to the customer service centers in a predetermined time interval in the process 32, the GSM device 3 may then send the longitude, and the latitude, and the satellite time to the customer service centers in the predetermined time interval in the process 33, and then to the end or the standby process 34.

Alternatively, the LP 5 may send out another command to the command can bus 102 in the process 35, and the GSM device 3 may then send out the location information to the customer service centers in a predetermined location or position in the process 36, OS the GSM device 3 may then send the longitude, and the latitude, and the satellite time to the customer service centers in the predetermined location or position in the process 37, and then to the end or the standby process 38.

Further alternatively, the LP 5 may send out a further command to the command can bus 102 in the process 39, and the GSM device 3 may then send out the location information to the customer service centers in a predetermined time interval in the process 310, the GSM device 3 may then send the longitude, and the latitude, and the satellite time to the selected telephones in the predetermined time interval in the process 311, and then to the end or the standby process 312.

Still further alternatively, the LP 5 may send out a still further command to the command can bus 102 in the process 313, and the GSM device 3 may then send out the location information to the customer service centers in a predetermined location or position in the process 314, the GSM device 3 may then send the longitude, and the latitude, and the satellite time to the selected telephones in the predetermined location or position in the process 315, and then to the end or the standby process 316.

Figure 4:
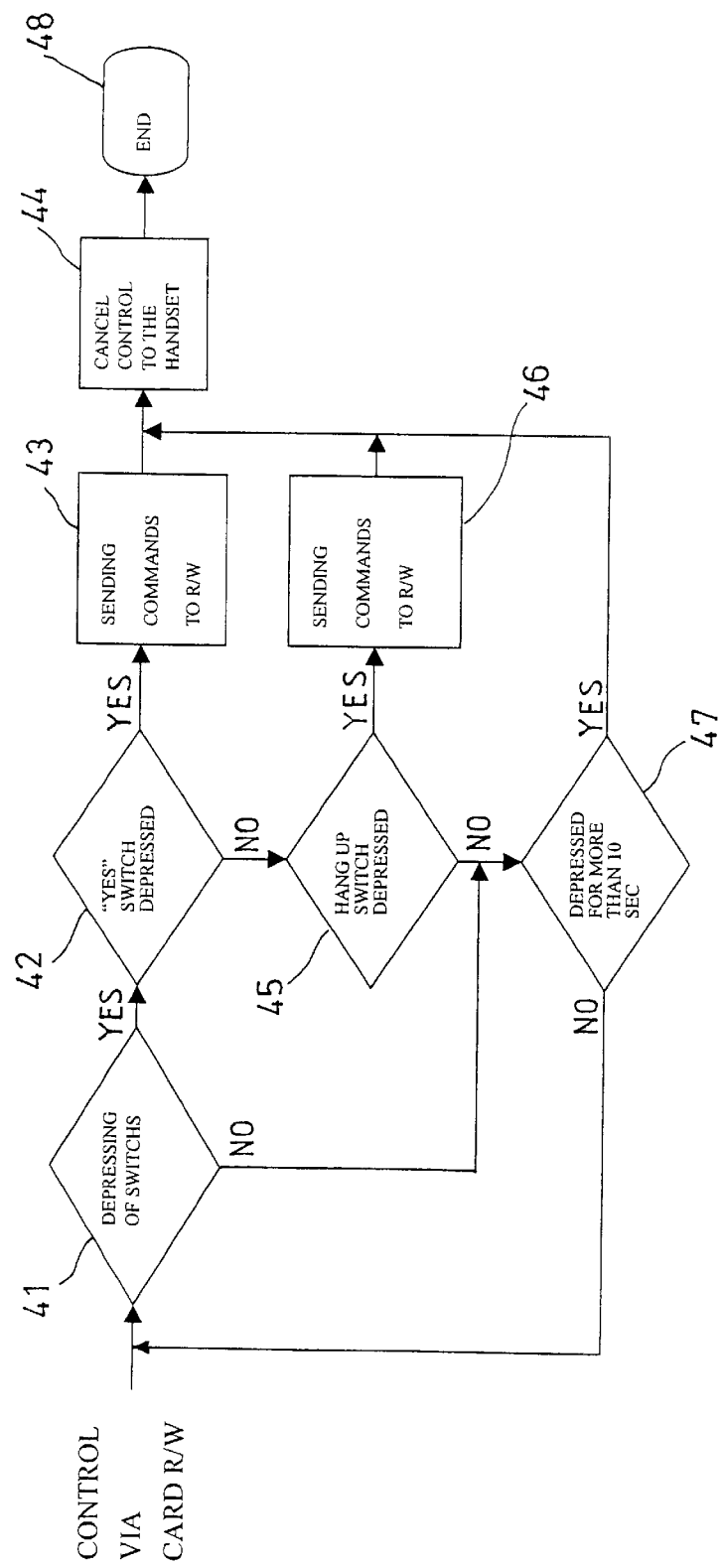

Referring next to FIG. 4, in order to operate the handsets, a process 41 is first provided for detecting or for checking whether any of the switches have been depressed or not. Another process 42 is provided for detecting or for checking whether the "yes" switch has been depressed or not. If the "yes" switch has been depressed, the GSM device 3 may then send out the commands to the card reader/writer (R/W) 8 via the command can bus 102 in the process 43, and may then cancel the control to the handset with the card R/W 8 in the process 44.

In the process 42, if the "yes" switch has not been depressed, then, a process 45 may be provided to detect or check whether the hang up switch has been depressed or not. If the hang up switch has been depressed, the GSM device 3 may then send out the commands to the card reader/writer (R/W) 8 via the command can bus 102 in the process 46, and may then cancel the control to the handset with the card R/W 8 in the process 44. If the hang up switch has not been depressed, another process 47 may be provided to detect or check whether the hang up switch has been depressed for more then 10 seconds or not.

If the hang up switch has been depressed for more then 10 seconds, the apparatus may then cancel the control to the handset with the card R/W 8 in the process 44, and then to the end or the standby process 48. If the hang up switch has not been depressed for more then 10 seconds, the apparatus may then go back to the process 41 again, in order to detect or to check whether any of the switches have been depressed or not.

Figure 5:
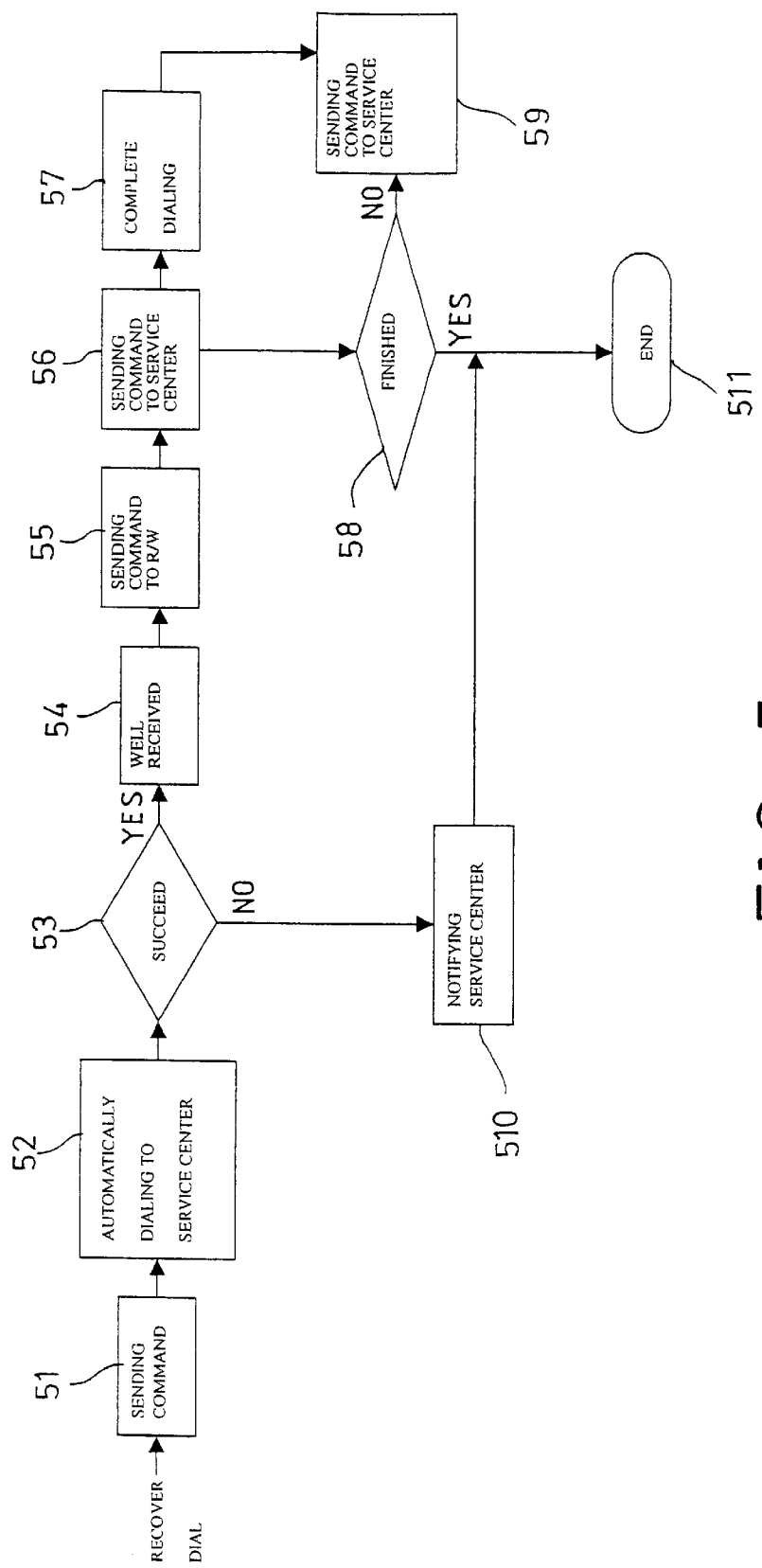

Referring next to FIG. 5, the users may use the card R/W 8 to deal with the others. When the confirmation key or button has been depressed after dealing with the others and with the card R/W 8, if the communication has been interrupted by any reasons, the GSM device may be used to recover the deal. First, the GSM device 3 may send out a continuing dealing message or command to the customer service centers in the process 51, and automatically dialing to the customer service centers in the process 52, the following process 53 may then be provided for detecting or for checking whether the dialing to the customer service centers has been succeeded or not.

If the dialing to the customer service centers has been succeeded, the customer service centers may then send out a requesting command to the GSM device 3, and the GSM device may then send out a "well received of the requesting command" message to the customer service centers in the process 54, and the GSM device 3 may then send out the command to the card R/W 8 to notify that the communication has been succeeded or linked in the process 55. The card R/W 8 may-then send back the command to the GSM device 3, and may then send the command to the customer service centers via the data/voice module 302 in the process 56.

The customer service centers may then send out the continuing dealing message to the card R/W 8, in order to complete the deal in the process 57. A following process 58 may be provided to detect or to check whether the phone or the communication has been finished or not. If the phone or the communication has not been finished yet, the card R/W 8 may continue or still or further send the command to the customer service centers via the data/voice module 302 in the process 59, and then go back to the process 57 in order to finish or to complete the deal.

In process 53, if the dialing to the customer service centers has not been succeeded, the GSM device 3 may then send out a command to the card R/W 8, and to notify that the dialing to the customer service centers has not been succeeded or has been failed, in the process 510, and then may go to the end or the standby process 511.

Figure 6:
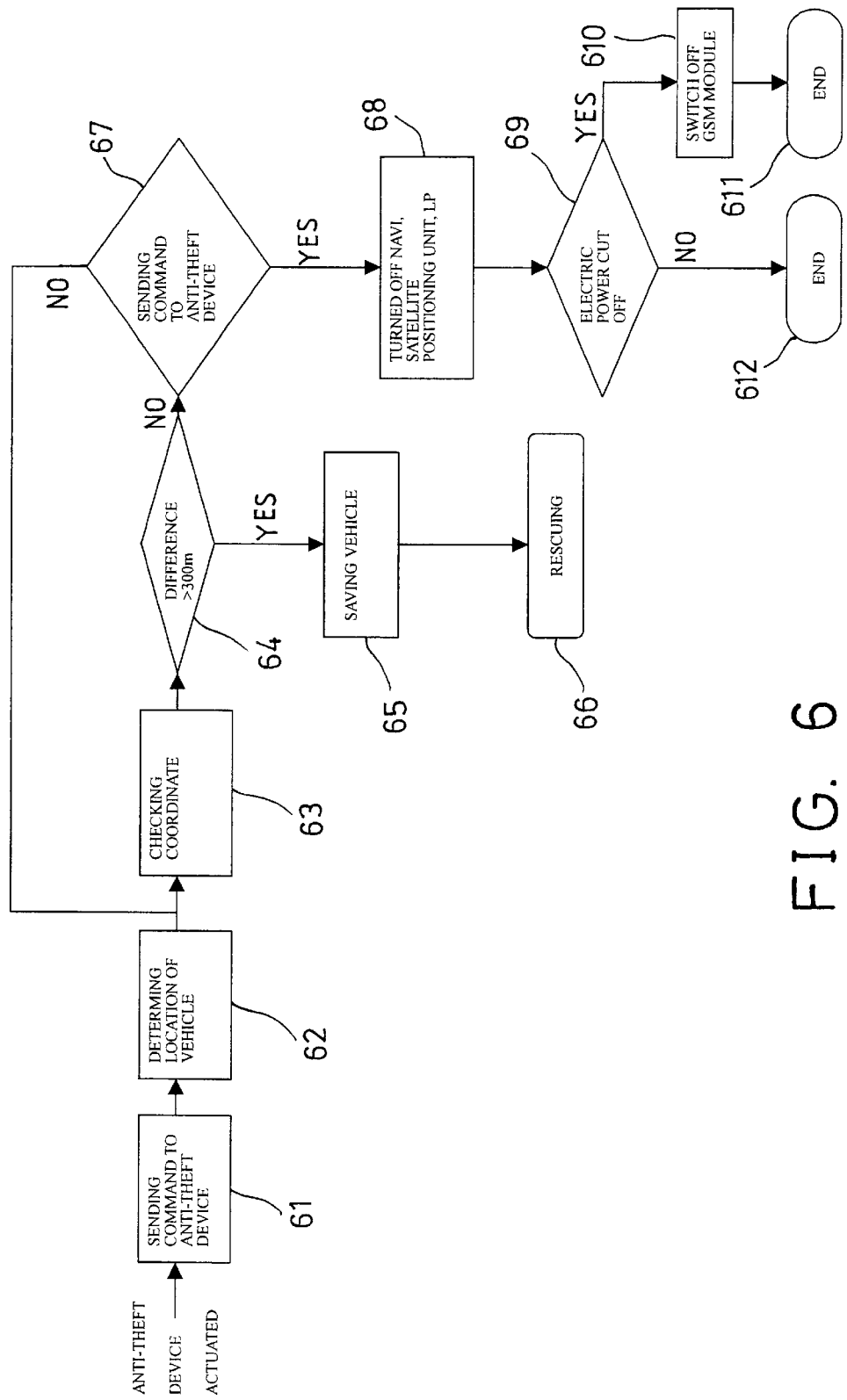

Referring next to FIG. 6, when the anti-theft device has been actuated by the unauthorized persons, the anti-theft device may then actuate the GSM device 3, and may then actuate the satellite navigation unit (NAVI) 6, or the satellite positioning unit 7, or the LP 5 via the GSM device 3, and the GSM device 3 may then send the commands to the anti-theft device 4 in the process 61. The anti-theft device 4 may then send out the detected condition to the GSM device 3 which may then send out the commands to the LP 5, for determining the location or the position of the vehicle in the process 62.

The LP 5 may then be used to check the coordinate of the vehicle in the process 63, and then to check whether the difference is greater than 300 meters in the process 64. If the difference is greater than 300 meters, the LP 5 may send out a command to the GSM device 3 to haul or to save the vehicle in the process 65, and then to conduct the rescuing or the notifying process 66 to the police, for example. If the difference is less than 300 meters, the GSM device 3 may send out a command to the anti-theft device 4 in process 67, and to turned off the NAVI 6, and/or the satellite positioning unit 7, and/or the LP 5 in the process 68.

A further process 69 may then be used for check whether the electric power to the apparatus has been cut off or not. If the electric power to the apparatus has been cut off, the GSM module 301 may send out a "GSM off" message to the customer service centers, and the GSM module 301 may then be switched off in the process 610, and then go to the end or switch off module 611. On the contrary, if the electric power to the apparatus has not been cut off, the GSM device 3 may then may go to the end or the standby process 612.

Figure 7:
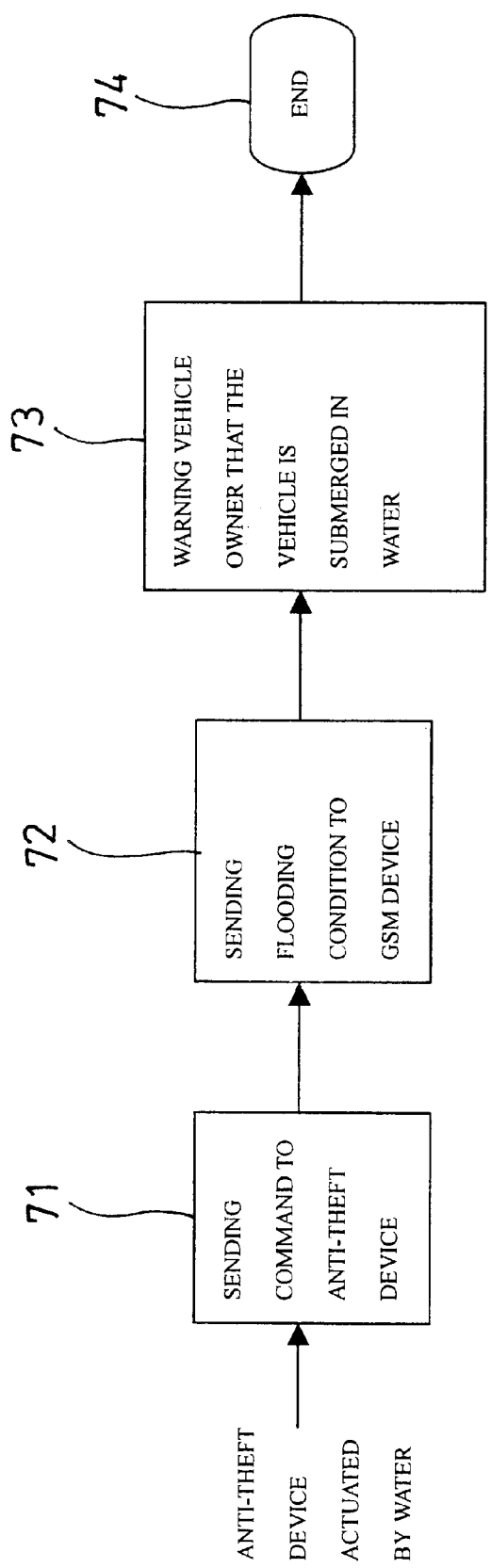

Referring next to FIG. 7, when the anti-theft device is actuated by flood or water, or when the anti-theft device detects the flood or the like, the anti-theft device may also actuate the GSM device 3, and may then actuate the satellite navigation unit (NAVI) 6, or the satellite positioning unit 7, or the LP 5 via the GSM device 3, and the GSM device 3 may then send the commands to the anti-theft device 4 in the process 71. The anti-theft device 4 may then send out the detected flooding or submerging condition to the GSM device 3 in the process 72. The GSM device 3 may then send out a message to notify or to warn the vehicle owner that the vehicle is submerged in water in the process 73, and then go to the end or the standby process 74.

Figure 8:
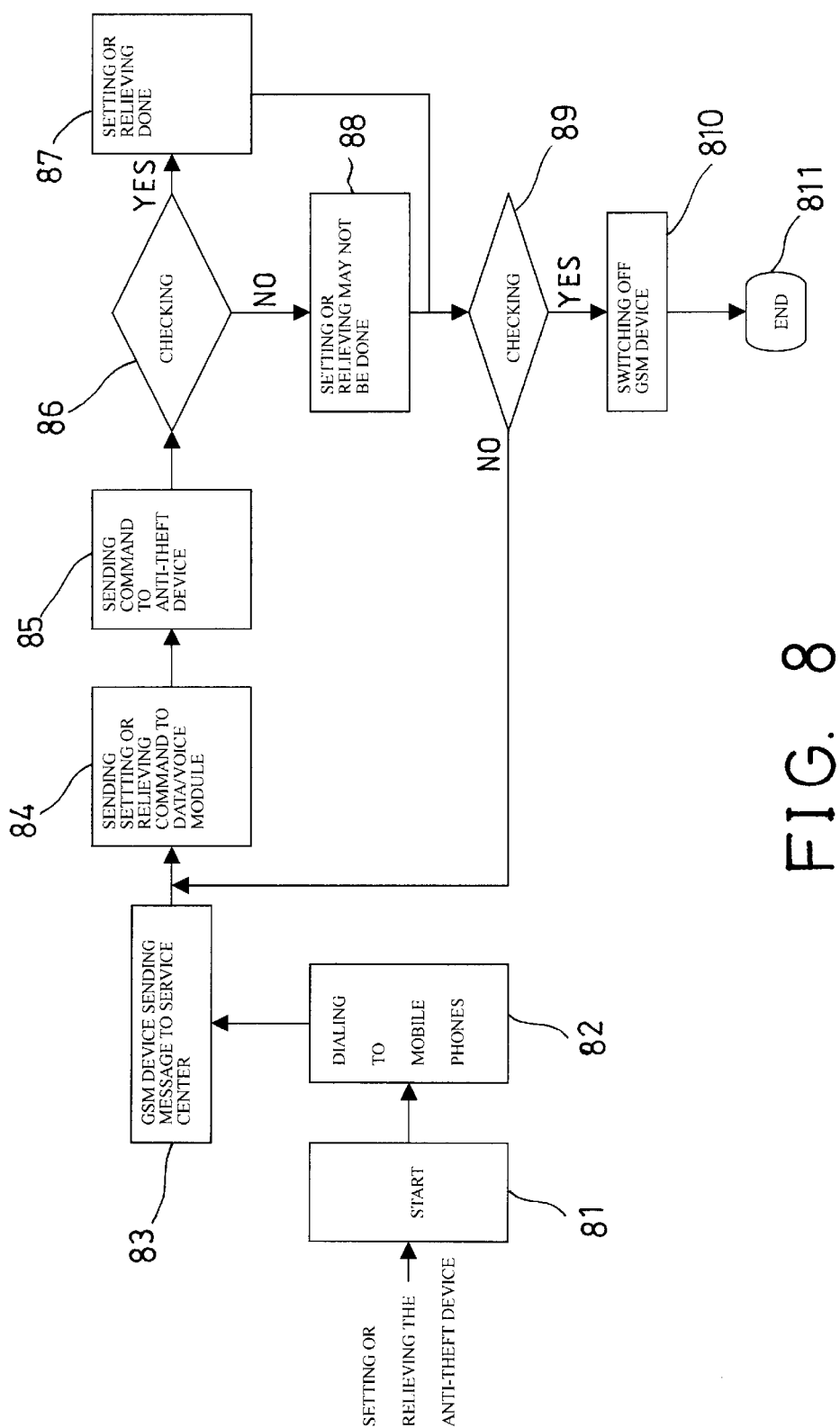

Referring next to FIG. 8, illustrated is the process to set or to relieve the anti-theft device 4 by the customer service centers. The customer service centers may use the remote control or pager receiver device 10 to start or to initialize the GSM device 3, and then to start or to initialize the NAVI 6 and/or the satellite positioning unit 7 and/or the LP 5 in the process 81. The customer service centers may then dial to the mobile or portable phones of the vehicle in the process 82. If the mobile or portable phones of the vehicle may not be entered for more than five minutes, the customer service centers may then set the GSM device 3 into the sleep module, and notify the vehicle owner the situation.

The customer service centers may then send out a requesting command to the GSM device 3, and the GSM device may then send out a "well received of the requesting command" message to the customer service centers in the process 83, the customer service centers may then send out a setting or relieving command to the data/voice module 302 in the process 84. The GSM device 3 may then send out the command to the anti-theft device 4 via the data can bus 101, in the process 85. A further process 86 may then be used for check whether the anti-theft device has been set or relieved or not.

If the anti-theft device has been set or relieved, the customer service centers may notify the vehicle owner that the setting or the relieving has been done in the process 87. On the contrary, if the anti-theft device has not been set or relieved, and if the customer service centers have not received any further message or response for more than five minutes, the customer service centers will terminate the communication and may notify the vehicle owner that the setting or the relieving may not be done in the process 88.

Another process 89 may then be used to detect or to check whether the customer service centers have cut off the phone or the communication or not. If the customer service centers have cut off the phone or the communication, the GSM module 301 may send out a "GSM off" message to the customer service centers, and the GSM device 3 may then be switched off in the process 810, and then go to the end or switch off module 811. If the customer service centers have not cut off the phone or the communication, the customer service centers may send out a setting or relieving command to the data/voice module 302 in the process 84 again.

Figure 9:
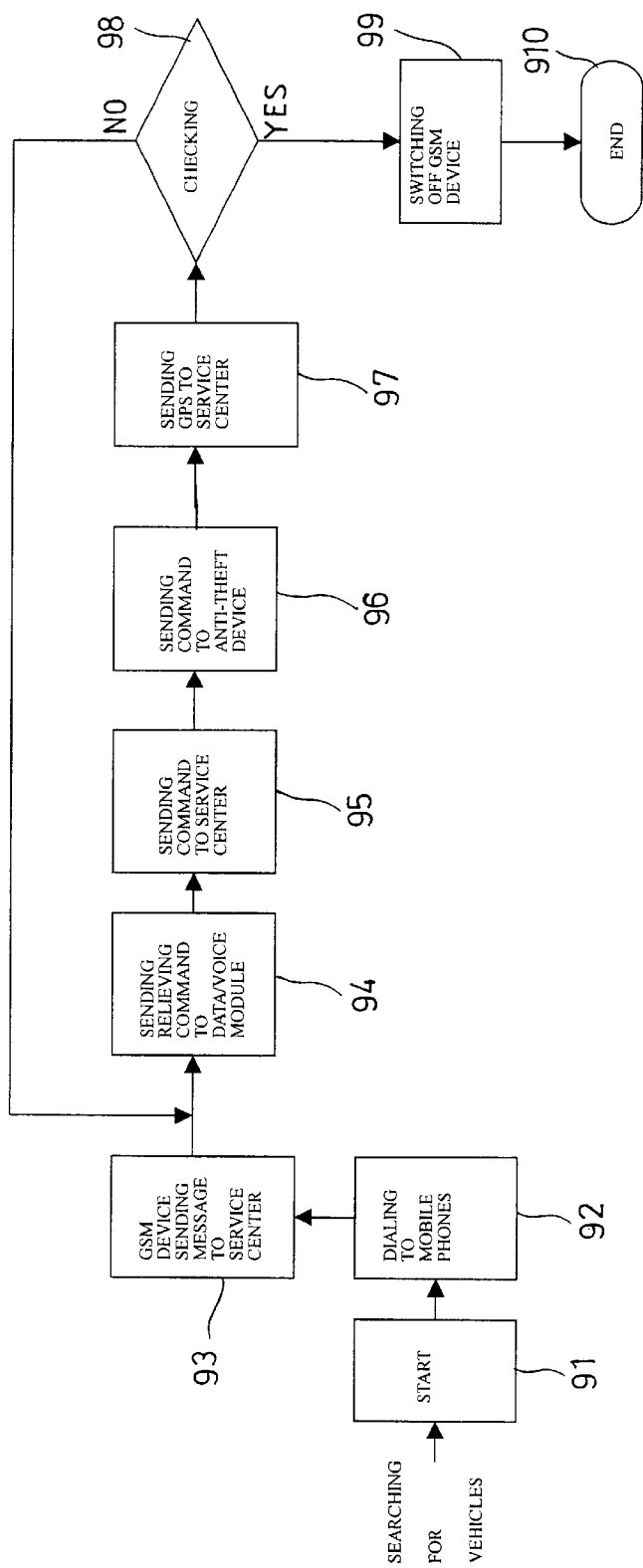

Referring next to FIG. 9, illustrated is the processes for searching for the vehicles. The customer service centers may use the remote control or pager receiver device 10 to start or to initialize the GSM device 3, and then to start or to initialize the NAVI 6 and/or the satellite positioning unit 7 and/or the LP 5 in the process 91. The customer service centers may then dial to the mobile or portable phones of the vehicle in the process 92. If the mobile or portable phones of the vehicle may not be entered for more than five minutes, the customer service centers may then set the GSM device 3 into the sleep module, and notify the vehicle owner the situation.

The customer service centers may then send out a requesting command to the GSM device 3, and the GSM device may then send out a "well received of the requesting command" message to the customer service centers in the process 93, the customer service centers may then send out a relieving command to the data/voice module 302 in the process 94. The GSM device 3 may then send out the command to the customer service centers via the data/voice module 302 in the process 95. The GSM device 3 may then send out the command to the anti-theft device 4 via the data can bus 101, in the process 96. The anti-theft device 4 may then send out the command to the GSM device 3 via the data can bus 101, and the GSM device 3 may then send out the general purposes radar (GPS) to the customer service centers via the data/voice module 302 in the process 97.

A further process 98 may then be used to detect or to check whether the customer service centers have cut off the phone or the communication or not. If the customer service centers have cut off the phone or the communication, the GSM module 301 may send out a "GSM off" message to the customer service centers, and the GSM device 3 may then be switched off in the process 99, and then go to the end or switch off module 910. If the customer service centers have not cut off the phone or the communication, the customer service centers may send out a setting or relieving command to the data/voice module 302 in the process 94 again.

Figure 10:
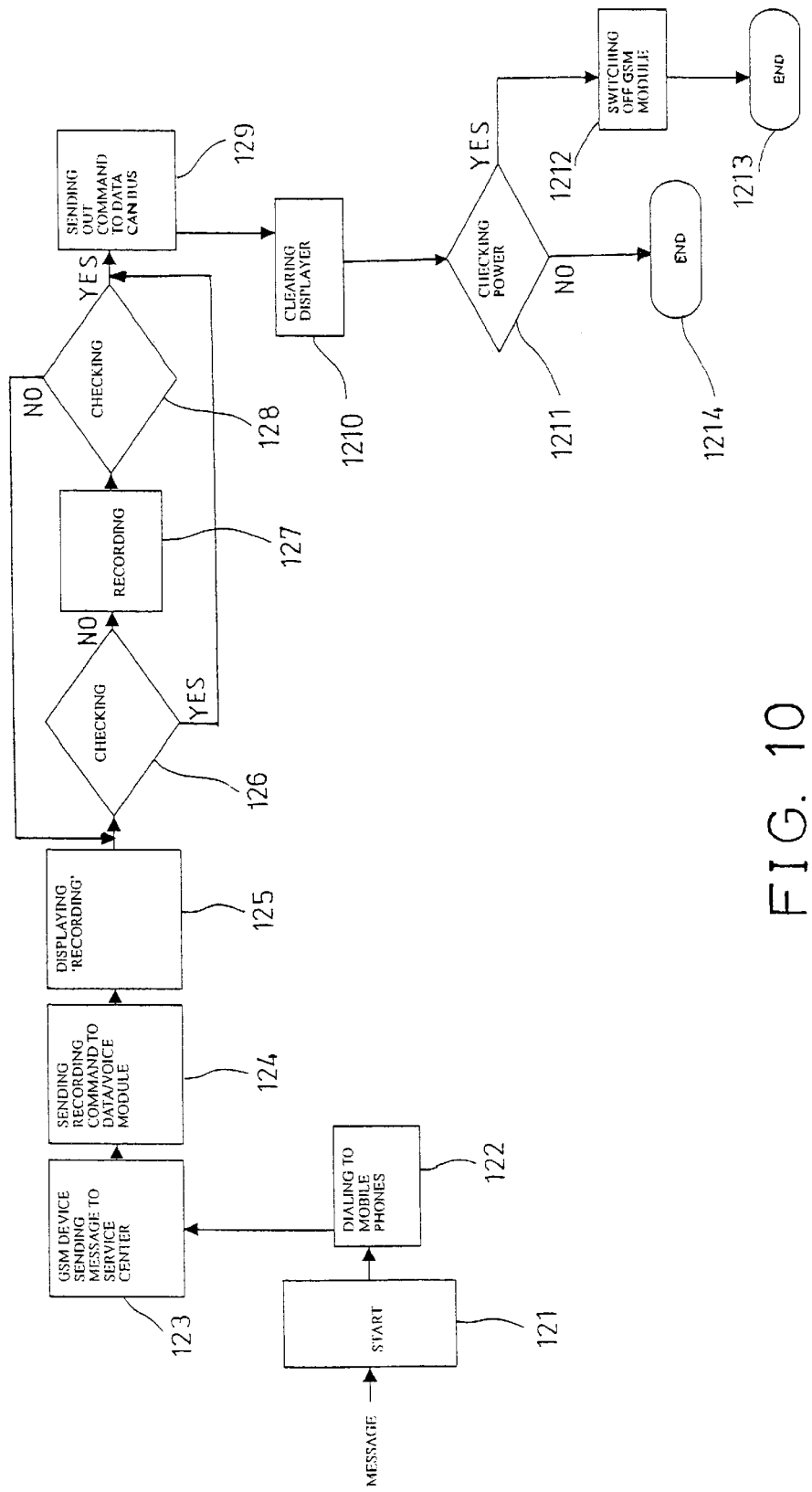

Referring next to FIG. 10, illustrated is the process to take or to leave the message to the customer service centers. The customer service centers may use the remote control or pager receiver device 10 to start or to initialize the GSM device 3, and then to start or to initialize the NAVI 6 and/or the satellite positioning unit 7 and/or the LP 5 in the process 121. The customer service centers may then dial to the mobile or portable phones of the vehicle in the process 122. If the mobile or portable phones of the vehicle may not be entered for more than five minutes, the customer service centers may then set the GSM device 3 into the sleep module, and notify the vehicle owner the situation.

The personal computer may then send out a command to the GSM device 3 that only the recording operation may be conducted, the customer service centers may then send out a requesting command to the GSM device 3, and the GSM device may then send out a "well received of the requesting command" message to the customer service centers in the process 123, the customer service centers may then send out a recording command to the data/voice module 302 in the process 124. The GSM device 3 may then control the displayer 207 to display and/or to flash the word "RECORDING" in the process 125.

A process 126 is then provided to detect or to check whether the vehicle owner has depress the cut-off key or button or not. If the vehicle owner has not depress the cut-off key or button, the vehicle owner may conduct the recording process 127, and another process 128 may be used to detect or to check whether the customer service centers have cut off the phone or the communication or not. If the customer service centers have cut off the phone or the communication, the GSM module 301 may send out a command to the data can bus 101 in the process 129, and to clear the message in the displayer 207 in the process 1210.

If the customer service centers have not cut off the phone or the communication in the process 128, the process 126 may be conducted again to detect or to check whether the vehicle owner has depress the cut-off key or button or not. If the vehicle owner has depress the cut-off key or button in the process 126, the GSM module 301 may directly go to the process 129 to send out a command to the data can bus 101.

After the message in the displayer 207 has been cleared in the process 1210, a further process 1211 may then be used for check whether the electric power to the apparatus has been cut off or not. If the electric power to the apparatus has been cut off, the GSM module 301 may send out a "GSM off" message to the customer service centers, and the GSM module 301 may then be switched off in the process 1212, and then go to the end or switch off module 1213. On the contrary, if the electric power to the apparatus has not been cut off, the GSM device 3 may then may go to the end or the standby process 1214.

Figure 11:
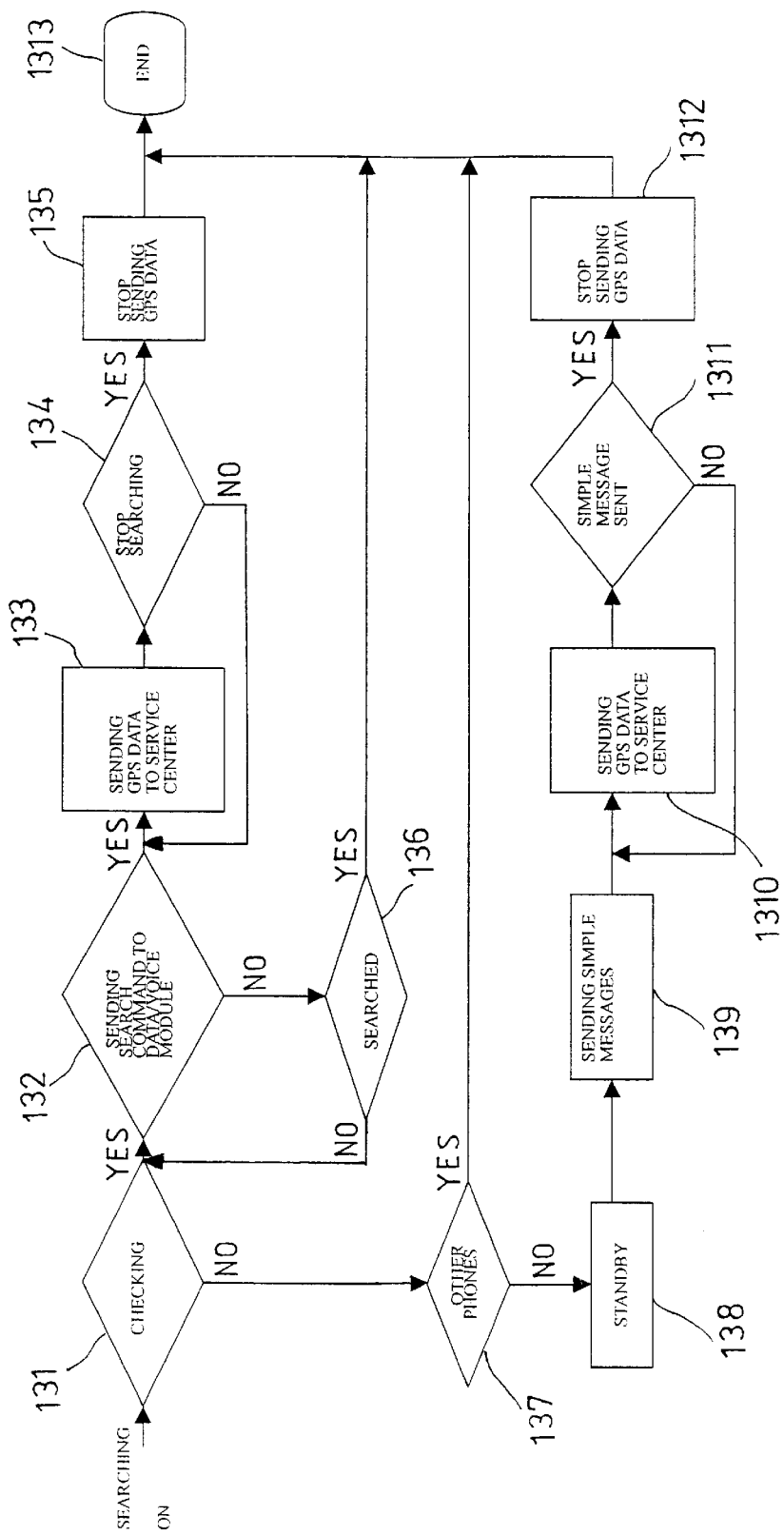

Referring next to FIG. 11, illustrated is the searching processes of the apparatus when the electric power to the apparatus has not been cut off, or when the electric power to the apparatus is on. A process 131 is first used or provided to detect or to check whether the vehicle owner or driver is contacting with the customer service centers or not. If the vehicle owner or driver is still contacting with the customer service centers, the customer service centers may be detected to issue or send out a search command via the data/voice module 302 or not in the process 132.

If the customer service centers do issue or send out a search command via the data/voice module 302, the GSM device 3 may send out the general purposes radar (GPS) data to the customer service centers every ten seconds via the data/voice module 302 in the process 133. A following process 134 may then be used to detect or to check whether the customer service centers have issued or sent out an order or a command to stop searching or not. If no, the GSM device 3 may go back to the process 133 to send out GPS data to the customer service centers every ten seconds via the data/voice module 302. If yes, the GSM device 3 will stop or no longer send out GPS data to the customer service centers via the data/voice module 302 in the process 135, and then may end or complete the operation in the process 1313.

In the process 132, if the customer service centers has been detected not to issue or send out a search command via the data/voice module 302, another process 136 may be used to detect or to check whether five minutes have been reached or not, for example. When the customer service centers has not issue or send out the search command for more than five minutes, the operation may be directed go to the end or the complete process 1313. If five minutes has not been reached, the customer service centers may still issue or send out the search command via the data/voice module 302 in the process 132.

In the process 131, if the vehicle owner or driver is not contacting with the customer service centers, a following process 137 may then be used to detect or to check whether the vehicle owner or driver is contacting with the other phones or not. If the vehicle owner or driver is contacting with the other phones, the operation may be directed go to the end or the complete process 1313. If the vehicle owner or driver is not contacting with the other phones, the GSM device 3 may be maintained in the standby status in the process 138, and the customer service centers may issue or send out simple messages or commands in the process 139. The GSM device 3 may then send out the GPS data to the customer service centers once every thirty seconds in the process 1310, and then may end or complete the operation in the process 1313.

A following process 1311 may then be used to detect or to check whether the customer service centers have issue or send out simple messages or commands. If the customer service centers still issue or send out simple messages or commands, the operation may go back to the process 1310 for allowing the GSM device 3 to send out the GPS data to the customer service centers once every thirty seconds. If the customer service centers do not or no longer issue or send out simple messages or commands, the GSM device 3 may stop sending out the GPS data to the customer service centers in the process 1312, and then may end or complete the operation in the process 1313.

Figure 12:
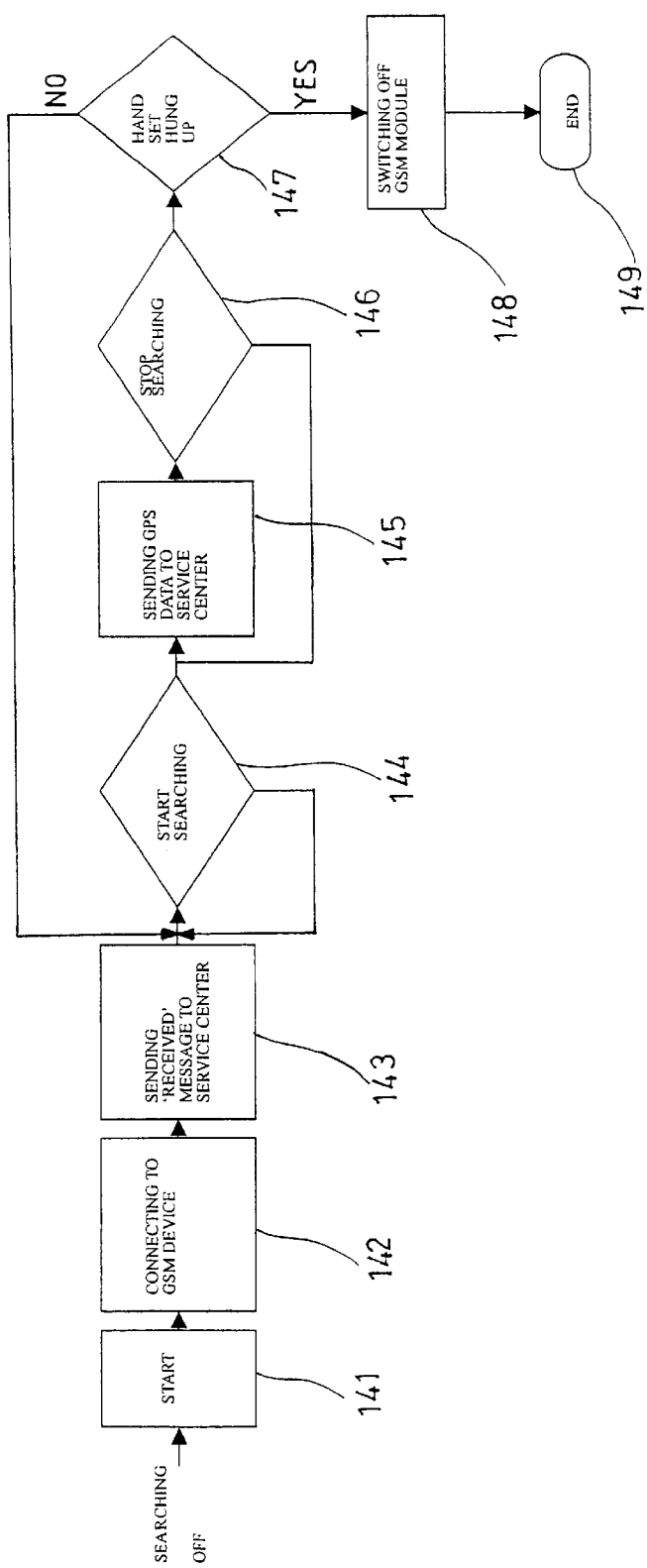

Referring next to FIG. 12, illustrated is the searching processes of the apparatus when the electric power to the apparatus has been cut off or is off. The customer service centers may use the remote control or pager receiver device 10 to start or to initialize the GSM device 3, and then to start or to initialize the NAVI 6 and/or the satellite positioning unit 7 and/or the LP 5 in the process 141, and then to connect to the GSM device 3 of the vehicle in the process 142. The customer service centers may then send out a requesting command to the GSM device 3, and the GSM device may then send out a "well received of the requesting command" message to the customer service centers in the process 143.

A following process 144 may then be used to detect or to check whether the customer service centers have issued or sent out an order or a command to start search or not via the data/voice module 302. If the customer service centers have not issued or sent out an order or a command to start search, the customer service centers may go back to the process 144 to issue or send out an order or a command to start search again. If the customer service centers have issued or sent out an order or a command to start search via the data/voice module 302, the GSM device 3 may send out the GPS data to the customer service centers every ten seconds in the process 145.

A following process 146 may then be used to detect or to check whether the customer service centers have issued or sent out an order or a command to stop searching or not. If the customer service centers have not issued or sent out an order or a command to stop searching, the GSM device 3 may go back to the process 145 to send out GPS data to the customer service centers every ten seconds. If the customer service centers have issued or sent out an order or a command to stop searching, a further process 147 may then be used to check whether the handset or the phone of the customer service centers has been hung up or not.

If the handset has been detected or checked to be hung up in process 147, the GSM module 301 may send out a "GSM off" message to the customer service centers, and the GSM module 301 may then be switched off in the process 148, and then go to the end or switch off module 149. On the contrary, if the handset has not been hung up yet, the customer service centers may go back to the process 144 to issue or send out an order or a command to start search again.

Accordingly, the information communicating apparatus in accordance with the present invention may be used for allowing the vehicle drivers to communicate with the customer service center, and for allowing the vehicle drivers to receive any useful information from the customer service center and to act precisely according to the received information.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A information communicating apparatus comprising:

a communication interface unit including a data can bus and a command can bus, a global system for mobile communication (GSM) device coupled to said data can bus and said command can bus of said communication interface unit respectively, an input/output interface unit coupled to said GSM device, an anti-theft device coupled to said GSM device, a location processor (LP) coupled to said GSM device and said data can bus and said command can bus of said communication interface unit, for communicating with selected customer service centers, and for obtaining information from the selected customer service centers, a satellite navigation unit (NAVI) coupled to said data can bus and said location processor (LP) and said GSM device, for sending information to said LP and said GSM device, a satellite positioning unit coupled to said LP and said GSM device, for sending information to said LP and said GSM device, a card reader/writer coupled to said data can bus and said command can bus of said communication interface unit, for receiving and sending out the information to and from said communication interface unit, a warning device coupled to said command can bus of said communication interface unit, for sending out warning information, a remote control or pager receiver device coupled between said communication interface unit and said GSM device for controlling said GSM device, and a computerized monitoring device coupled to said data can bus and said command can bus of said communication interface unit, for monitoring and checking the information sending into and out of said communication interface unit.

2. The information communicating apparatus according to claim 1, wherein said GSM device includes a GSM module, a data/voice module, a recording module, and a data or information receiving module provided therein.

3. The information communicating apparatus according to claim 1, wherein said input/output interface unit includes at least one antenna, a microphone, a radio, a displayer, a intelligent transportation system switch, an ear piece, an air bag actuating device, at least one hand set, and a mobile phone interface coupled to said GSM device, and a personal virtual assistant device coupled to said GSM device.

4. The information communicating apparatus according to claim 3, wherein said at least one antenna is a general purposes radar (GPS) antenna.

5. The information communicating apparatus according to claim 3, wherein said at least one antenna is a GSM antenna.

6. The information communicating apparatus according to claim 3, wherein said at least one antenna is a radio frequency antenna.

7. The information communicating apparatus according to claim 1, wherein said satellite navigation unit (NAVI) includes a processor device coupled to said data can bus for receiving the information sending out from the selected customer service centers.

8. The information communicating apparatus according to claim 7 further comprising a code transforming device coupled between said processor device of said satellite navigation unit and said data can bus for receiving the information sending out from the selected customer service centers.

9. The information communicating apparatus according to claim 7, wherein said processor device of said satellite navigation unit is coupled to said LP and said GSM device, for sending the information to said LP and said GSM device.

* * * * *